April 19, 1966 W. J. PORTER, JR., ET AL 3,246,978
FLUID BED PROCESS
Filed April 19, 1963
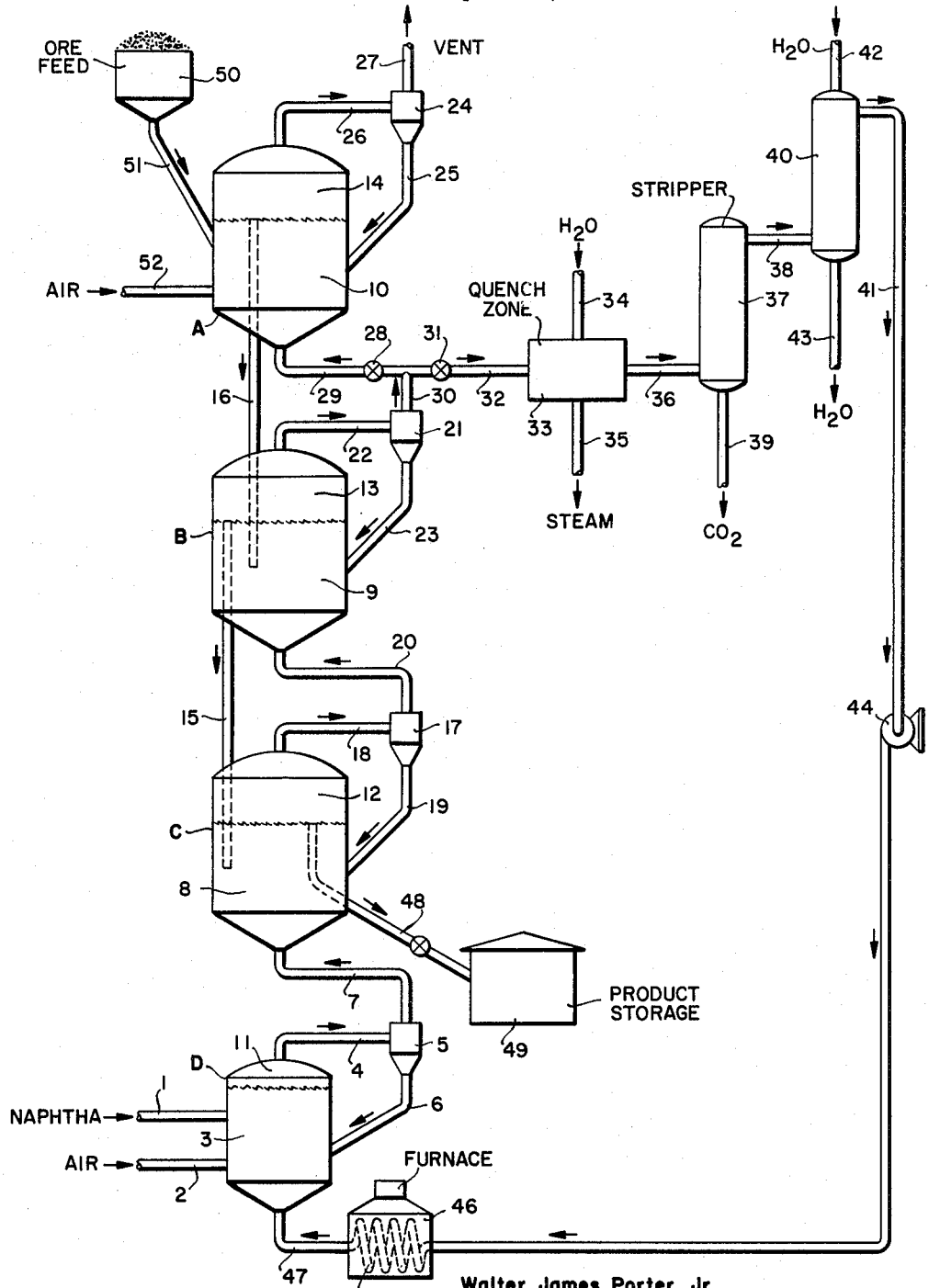
Walter James Porter, Jr.
John Frederick Moser, Jr. Inventors
By Perry Carvellas
Patent Attorney

United States Patent Office 3,246,978
Patented Apr. 19, 1966

3,246,978
FLUID BED PROCESS
Walter James Porter, Jr., and John Frederick Moser, Jr., Baton Rouge, La., assignors to Esso Research and Engineering Company, a corporation of Delaware
Filed Apr. 19, 1963, Ser. No. 274,126
6 Claims. (Cl. 75—26)

This invention relates to a process and apparatus for the reduction of metal oxides with carbon monoxide-containing gases. The invention relates to a process of regenerating and recycling partially spent reducing gases and combining the recycled gases with freshly generated reducing gases to carry out reduction of the metal oxides. Specifically, the invention relates to a process of reducing metal oxides at high temperatures with reducing gases containing carbon monoxide and hydrogen wherein the carbon monoxide and hydrogen are partially oxidized to carbon dioxide and water, cooling the hot partially oxidized gases, removing carbon dioxide, and water, recompressing the thus treated gases, reheating the gases and feeding them back to the reducing zone. More specifically, this invention relates to a process of preventing catastrophic carbonization, carbon deposition and equipment failure while reducing iron ore with a gas-containing carbon monoxide and hydrogen which comprises rapidly cooling the recycle off-gases, regenerating these gases, recompressing the gases, rapidly heating the gases to the reducing temperature, and recycling the gases to the reducing zone.

In order to develop an efficient, practical direct reduction process for metal oxides, it is necessary to find an inexpensive reducing gas and an economic, efficient method for supplying the heat necessary to carry out the reduction reaction. A process where the reducing gas is used on a once-through basis may be satisfactory where the efficiency of reduction is high and/or where the cost of the reducing gas is low. However, in order to lower the cost of the reducing gas where there is low efficiency reduction in the reducing zone, it is necessary to recycle the unused portion of the reducing gas. In reducing iron oxides to metallic iron, the principal known reducing gases consist of a mixture of hydrogen and carbon monoxide or hydrogen alone. In using hydrogen alone as the reducing gas, substantial amounts of heat are required to carry out the reaction. This gas, however, can be easily recycled by merely cooling to condense out the oxidation product of the reduction reaction, namely, water, and the gas may be recompressed and heated to elevated temperatures and recycled to the reducing zone to extinction. Reducing gases containing substantial portions of CO and $H_2$ require less heat to carry out the reduction. However, where using a gas containing CO as the reducing gas, the problems encountered in recycling this gas are much more complex.

In reducing iron ore, temperatures in the reducing zone may vary between 1200 F. and about 1800° F. When reducing metal oxides with carbon monoxide, the carbon monoxide is oxidized to carbon dioxide and the iron oxide is reduced to ferrous iron and to metallic iron. However, when carbon monoxide is at temperatures of between 900 1200° F., the carbon monoxide is converted to carbon dioxide and carbon according to the reaction $$2CO \rightleftharpoons CO_2 + C$$

In order to recycle a carbon monoxide containing reducing gas, which contains carbon dioxide and water, it is necessary to cool the recycle gas from the reducing temperature of about 1200 to 1800° F. to about ambient temperature to remove $H_2O$ and $CO_2$. The cooling from the elevated temperature to a temperature below about 900° F. must occur very rapidly or else the above described reaction which leads to carbon deposition and catastrophic carbonization will occur. This reaction proceeds vary rapidly at temperatures between 900 and 1200° F. The reheating step, prior to sending the gases back to the reducing zone, is even more critical than the cooling of the off-gases step. In order to be able to introduce the gases back into the bottom of the reactor it is necessary to recompress the reducing gases. Most known types of compressors cannot withstand the necessary high temperatures existing in the reactor, i.e., temperatures of 1200 to 1800° F. The gases, therefore, could not be recompressed without cooling. The gases must be recompressed from about ambient pressure to the pressure necessary for introduction into the reducing zone prior to reheating the recycled gas. The gases are therefore recompressed prior to heating the gases. The heating of the gases up to about 900° F. can be carried out at slow rates; however, heating between 900 to 1200° F. must occur very rapidly or the reaction $2CO \rightarrow CO_2 + C$ occurs. None of the known commercial processes have overcome the problems of carbon deposition and catastrophic carbonization in either the cooling step or the heating step. While there are several known processes for recycling hydrogen, there are no known commercial processes for recyling reducing gas containing carbon monoxide which would not result in equipment failure due to catastophic carbonization and carbon deposition.

The less costly reducing gas is one in which a carbonaceous fuel is partially oxidized with air to produce a reducing gas containing carbon monoxide, hydrogen, and nitrogen. So, assuming this reducing gas is used to carry out the reduction, the next problem encountered is one of providing sufficient heat in the reducing zone to carry out the reduction. Several schemes have been considered for supplying the heat to an iron ore reduction zone. One method of providing the heat involves preheating the iron ore to an extremely high temperature prior to introducing it into the reduction zone thereby allowing the sensible heat of the preheated ore to supply the heat for the endothermic reduction reaction. Another method is to preheat the reducing gas to excessively high temperatures and allow the sensible heat of the reducing gas to provide the heat required to carry out the reduction. Either of these schemes alone have proven to be unsatisfactory; however, use of both of these schemes together has provided a very practical means of providing heat to the reducing reactor. Failure to provide an efficient method of heating, regenerating and recycling a reducing gas containing CO whereby carbon deposition and catastrophic carbonization is avoided has been the main stumbling block in developing an economic process for direct iron ore reduction.

The term catastrophic carbonization is defined as the reaction that occurs when carbon is deposited from a gas containing CO on a metal surface under conditions such that some of the carbon deposited reacts with the metal surface to form a metal carbide which, in turn, catalyzes the reaction causing the deposition of more carbon at a more rapid rate. The deposition of carbon will cause plugging and failure of equipment due to pressure buildup whereas the carbonization of the metal surfaces will cause pitting, weakening and failure of the metal surfaces and equipment. This reaction is not a primary problem inside the reactor due to the presence of iron oxides on which the carbon may be deposited and which, in turn, are reduced to metallic iron. However, in compressors, risers, downcomers, diplegs, transfer lines, pipes, etc., this reaction is a major problem at temperatures between 900 and 1200° F. In refractory lined equipment the deposition of carbon is still a major problem, causing plugging even though there is no pitting of the equipment.

The principal reaction involved in catastrophic carbonization is as follows: $2CO \rightleftharpoons CO_2 + C$.

This reaction occurs at about 900 to 1200° F. at about atmospheric pressure and goes strongly to the right. At temperatures of above about 1200° F. the equilibrium is strongly to the left if there is any carbon present. At temperatures below 900° F. the reaction rate in either direction is negligible. At pressures above atmospheric, the temperature range at which the reaction goes to the right at an appreciable rate will be somewhat broader than it is at atmospheric pressure. For purposes of facilitating the description of the invention and for simplifying the description throughout this specification the temperatures at which the reaction goes to the right will be considered to be 900 to 1200° F., regardless of the pressure at which the reaction is carried out, it being understood that these temperatures will vary with the pressure in a known manner.

There are iron ore reduction processes known whereby gases containing carbon monoxide and hydrogen are used to reduce the iron and the off-gases from the reducing zone containing carbon monoxide, hydrogen, $CO_2$, and water are cooled, treated to remove water and $CO_2$, and the off-gases containing primarily CO and $H_2$ are recycled to the reducing zone. Prior to introduction of the recycle carbon monoxide and hydrogen the recycle gas may be mixed with freshly generated reducing gas. Alternatively, it may be introduced by itself directly to the reducing zone. The recycled reducing gas, before being introduced to the reducing zone, is preheated to a temperature slightly above the temperature at which the reduction is carried out. The most frequently mentioned method of reheating this recycle gas is by indirect heat exchange in a gas heater. However, this means of preheating a CO containing recycled reducing gas is completely unsatisfactory because the gas is gradually heated from about ambient temperature up to about 1600 to 1800° F. and there is sufficient residence time in the temperature range of 900 to 1200° F. for carbon to deposit and to cause plugging and for catastrophic carbonization to occur in the heater. There has, until now, been no recognition of this problem or of any method by which this problem can be overcome.

In accordance with the present invention, metal oxides can be reduced by contacting said oxides with a reducing gas containing CO and $H_2$ wherein efficient use of the reducing gases is obtained by recycling the off-gas from one of the reducing zones. The reducing gas containing CO and $H_2$ may be made by any of several conventional methods involving partial combustion of a carbonaceous fuel in the presence of an oxygen-containing gas. The reducing gas is countercurrently contacted with the metal oxides to be reduced which are present in a finely divided form, either in fluid beds, moving beds, or other conventional means of contacting devices, whereby the metal oxides are reduced and the reducing gases are partially oxidized to $CO_2$ and $H_2O$. The reduction reaction is carried out at elevated temperatures and the effluent gases from the reduction zone containing the metals in the highest state of oxidation are withdrawn at high temperatures. In order to regenerate the reducing gas so that it is suitable for recycle to the zone containing the most highly reduced metal oxides, it is necessary to remove the oxidation products from the reducing gas, namely, the $CO_2$ and the $H_2O$. The effluent gases are withdrawn from the reducing zone and suitably cooled to below the dew point of the water in the stream. Condensed water is withdrawn. For efficient removal of $CO_2$, it is desirable to lower the temperature of the effluent gases to about ambient temperature. The partially spent gases leaving the ferric reduction zone are at a somewhat lower pressure than that which exists in the ferrous reducing zone. This difference in pressure is due ot the pressure lost of the reducing gases as they pass through the fluidized beds in the reduction zones. In order to re-introduce this gas into the bed of lowest degree of oxidation, it is necessary to increase the pressure of the recycle gas to the pressure existing within that zone. The pressure of the recycle is increased at ambient temperature and then reheated to the temperature existing in the reactor to which it is to be introduced.

By rapidly cooling the effluent gases from the reducing zone from a temperature of about 1400 to 1600° F. to a temperature of less than 900° F., little or no carbon is deposited from these gases in transiting the temperature range in which the conversion of carbon monoxide to carbon dioxide and carbon occurs. Any by gradually heating the regenerated recycle recompressed reducing gas to about 800° F. and then rapidly heating it from about 800 to 900° F. to about 1600 to 1800° F. there is no opportunity for the CO to be converted to $CO_2$, for deposition of the carbon, and catastrophic carbonization to occur. Therefore, in accordance with the present invention, it is now practical to recycle this reducing gas and to thereby lower the cost of the reducing gas by virtue of the economies effected in the recycle operation.

The reduction of metal oxides with a reducing heat gas comprising carbon monoxide and hydrogen is known in the art. Various ores, including iron, nickel, chromium, vanadium and titanium ores, have been reduced in this manner. This invention is principally concerned with, though not limited to, the reduction of iron oxides to metallic iron. Reducing gases containing carbon monoxide can be made from carbonaceous fuel, such as coal, coke, charcoal, liquid and gaseous hydrocarbons, and the like. These fuels can be reacted with an oxygen-containing gas, wherein the oxygen supplied is insufficient to completely oxidize the carbonaceous fuel to $CO_2$, to produce carbon monoxide and/or carbon monoxide and hydrogen, depending on which fuel is used. The ratio of carbon monoxide to hydrogen produced will depend largely on the particular fuel reacted with the oxygen-containing gas. The principal processes known for producing gases containing carbon monoxide and hydrogen involve the use of a catalytic gas reformer, a non catalytic gas reformer, a fluid coke gasification unit, and the like. The particular fuel from which the reducing gas is formed does not form an essential part of the present invention.

When using air, or oxygen-enriched air, as the oxygen-containing gas to reform the carbonaceous fuel, the reducing gas will contain a certain amount of nitrogen. Having nitrogen present in the reducing gas is advantageous to a certain extent in that it provides a denser fluidizing agent which gives smoother fluidization in the reduction zone. However, excessive amounts of nitrogen are not desirable in the reducing gas in that it tends to dilute and diminish the reducing effect of the reducing constituents present. Therefore, periodically, the reducing gas can be purged to remove excessive amounts of $N_2$ from the reducing gas except where part of the gas is used for preheat of incoming feed as described herein, in which case the purge is not necessary.

In a preferred embodiment of the present invention, liquid naphtha and air are injected into a fluidized bed of coke at elevated temperatures wherein the liquid naphtha is reformed to carbon monoxide and hydrogen. This method is preferred because a very high quality gas available at a high temperature is obtained from the reaction at low cost. The effluent gases comprise CO, hydrogen and nitrogen. There is little or no $CO_2$ or $H_2O$ present in the effluent gases from this process. This is because of $CO_2$ or $H_2O$ are formed initially, by the gasification or reforming reaction in the reaction zone, the fluidized bed of coke which is essentially carbon provides carbon to react with the $CO_2$ or $H_2O$ thus converting these oxidation products back into hydrogen and CO. The reaction conditions are maintained so that the amount of $CO_2$ or $H_2O$ present in the effluent gases is not excessive. Therefore, the hot effluent gases can be used directly in the reduction zone which contains essentially metallized iron, without fear of back-oxidation of the iron. These gases may be used directly at the elevated temperatures at which they leave the gasification reaction zone, thereby providing to the reduction zone the sensible heat of the gases which is sufficient to effect the reduction of the iron oxide to metallic iron in said reduction zone. The reaction conditions, however, in this gasification zone are maintained so that there is not an excessive net amount of carbon consumed in this zone. However, in the event that carbon is consumed, additional coke may be added to the bed to make up for carbon consumed.

Sufficient heat can be generated in this zone by merely burning the fuel to CO to carry out the endothermic reduction reaction in the reducing zone and to rapidly preheat the recycle gases. Depending on the particular fuel used in the fluid bed gasification zone, the ratio of hydrogen to carbon monoxide produced can vary between 2 to 4 hydrogen to 1 carbon monoxide. Though a greater amount of heat could be produced by burning the carbon present in the carbonaceous fuel all or part of the way to $CO_2$, any advantage obtained would have to be lost due to the fact that the effluent gases would have to be cooled to condense out the water formed and treated to remove $CO_2$ and then reheated to the temperature at which they need be introduced to the reduction zone. Therefore, the greatest advantage and heat input to the reducing zone can be obtained by burning carbonaceous fuel primarily to CO rather than to $CO_2$. Another advantage obtained by using a fluidized bed of coke for the gasification zone is that this hot fluid bed of coke can be used to rapidly increase the temperature of the recycle $CO+H_2$ because the fluid solids bed is an excellent and rapid means of effecting heat exchange. Therefore, the recycled $CO+H_2$, upon being introduced to the fluid bed gasification zone, is immediately brought up to the temperature existing in the fluid bed gasification zone. Recycle gas can be preheated to about 800° F. in a conventional furnace without fear of carbon deposition or catastrophic carbonization. The gas which has been preheated to 800° F. can then be introduced to the fluid coke bed which is at a temperature of about 1600-2200° F. and will be raised almost instantaneously to the temperature of 1600-2200° F. This rapid heat exchange ability is one of the basic characteristics of the fluidized bed.

In the above described manner, a cheap, efficient means of making a high quality, low cost reducing gas obtaining CO and $H_2$ and a simple, efficient means of recycling this $CO+H_2$ reducing gas and avoiding the problem of carbon deposition, plugging of equipment, and catastrophic carbonization of metal vessels has resulted.

In a preferred embodiment of the invention, the direct reduction of iron ore is carried out in a fluidized bed of finely divided particles of ore which are directly contacted with reducing gas. The fluidized beds may be 5 to 30 ft. in diameter and 3 to 40 ft. in height. The finely divided ore, when fluidized by the reducing gases, takes on the appearance of a liquid and has an apparent density, depending on the velocity and particle size distribution, which can vary between 50 lbs./cu. ft. and 180 lbs./cu. ft. Also, much like water, the pressure at the bottom of this bed will be roughly directly proportional to the height of the bed and fluidizing gases passing through this bed will experience a change in pressure from the bottom of the bed to the top of the bed.

For a better understanding of the present invention, reference may be had to the accompanying drawing which comprises a typical flow diagram illustrating the procedural steps for processing according to the present invention. The figure on the attached drawing illustrates diagrammatically the application of the process of this invention to the reduction of iron ore. Various pumps, valves, heat exchange equipment, monitoring and control equipment have been omitted from the drawing in order to simplify it.

In accordance with the preferred embodiment of the present invention, finely divided iron ore consisting essentially of $Fe_2O_3$ is reduced in three stages. The ore is fed from storage bin 50 and is introduced into the ferric reduction zone A through downcomer 51 into a fluidized bed of iron ore 10. The $Fe_2O_3$ in bed 10 is fluidized by the reducing gas introduced into the bottom of zone A through line 29. Reducing gas containing carbon monoxide and hydrogen and small amounts of $H_2O$ and $CO_2$ are introduced through line 29 into bed 10 wherein the reducing gas is mixed with air introduced through line 52 into bed 10 whereby partial combustion of the reducing gas takes place in bed 10 raising the temperature of the bed up to about a temperature of 1400 to 1800° F. There is a sufficient amount of CO and $H_2$ in the gas introduced through line 29 to reduce the $Fe_2O_3$ at least in part to $Fe_3O_4$ and to provide suffiicent preheat as sensible heat of the ore in this bed to carry out the reduction in bed 9. Ferric reducing and preheat zone A can be at a pressure of about atmospheric to about 1000 p.s.i.g, e.g., about 10 p.s.i.g., and the pressure is not critical.

The products of the combustion taking place in bed 10 collect in chamber 14 and are withdrawn through line 26 and introduced into cyclone separator 24. The effluent gases from zone A have a ratio of $CO_2$ to CO of about 3 to 20, of $H_2O$ to $H_2$ of about 6 to 25. The effluent gases from this zone are substantially spent insofar as reducing capacity and fuel value are concerned and are vented to the atmosphere through an appropriate pressure release valve, not shown, through line 27. Any entrained iron oxide particles that are present in the gas are separated in the gas cyclone separator 24 and returned through line 25 to bed 10 of zone A.

As the preheated ore is fed to zone A, the fluidized bed 10 increases in height and overflows into downcomer 16 whereby it is introduced into the ferrous reducing zone B, bed 9. The reducing conditions are such that the $Fe_3O_4$ is reduced substantially to FeO in this bed. Reducing gas comprising CO and $H_2$ and small amounts of $CO_2$ and $H_2O$ are introduced into bed 9 by a suitable fluidizing device via line 20, fluidizing the finely divided iron oxide in this bed and reducing the $Fe_3O_4$ to FeO. The temperature in bed 9 is maintained at about 1200 to 1800° F. and the pressure at about 5 to 15 p.s.i.g. higher than in zone A, i.e., a pressure of about 15 p.s.i.g. The ratio of $CO_2$ to CO in this zone is substantially less than that existing in zone A and is 1.0 to 4.0 and the ratio of $H_2O$ to $H_2$ is 0.3 to 6.0. Reducing gases, after reducing the finely divided iron oxide in bed 9, are collected in chamber 13 and withdrawn through line 22 into cyclone separator 21. These off-gases contain entrained iron oxide particles which are separated from the gas in cyclone 21 and returned to bed 9 via dipleg 23. These fines may be all returned to bed 9 or a portion of them may be returned by means not shown, i.e., a suitable dipleg, to bed 8. The effluent gas from cyclone 21 is fed through line 30 and a portion of its is sent via valve 28 and line 29 into the ferric reducing zone A to carry out reduction and preheat in that zone. This gas contains a considerable amount of CO and $H_2$, which gas has a high reducing capacity and fuel value. As previously described, a portion of this off-gas is partially burned in zone 10 and there is still enough reducing capacity to reduce the $Fe_2O_3$ to $Fe_3O_4$ in zone 10. However, the major portion of this effluent gas, e.g., ⅓ to ⅔ by volume of the gas, is taken through valve 31 and line 32 at a temperature of up to about 1400 to 1600° F. and introduced into water quench zone 33 wherein it is directly contacted with a large volume of cold water fed into zone 33 through line 34 and rapidly reduced in temperature from about 1400 to 1600° F. to a temperature below about 900° F. The cooled effluent gases are removed through line 36 and are below the temperature at which either carbon deposition or catastrophic carbonization can occur. The water in quenching and cooling the hot gases is increased in temperature and may be used with a suitable means of heat exchange to heat other streams or to operate small auxiliary equipment. The thus heated water is withdrawn from the quench zone through line 35.

In zone B the $Fe_3O_4$ from zone A is reduced to FeO and as bed 9 increases in height due to the overflow from zone A, the FeO overflows into downcomer 15 and passes from zone B into zone C.

The FeO is introduced into bed 8 of zone C wherein it is reduced to Fe. The reduced iron is withdrawn from zone C by overflowing into downcomer 48 and the product is collected in product collection container 49. Depending on the conditions of reduction in zone C, this iron product can be 85 to 98% metalized, i.e., 85 to 98% of the iron present will be in the metallic form. The composition of the reducing gas introduced into bed 8 is critical. The gas is introduced into bed 8 through line 7. In bed 8, the reducing gas is partially oxidized while reducing the FeO to Fe. The effluent gases from bed 8 are collected in chamber 12 and, together with entrained solids, are withdrawn through line 18 and introduced at the cyclone separator 17. These effluent gases contain a $CO_2$ to CO ratio of about 0.1 to 0.4 and a $H_2O$ and $H_2$ ratio 0.1 to 0.4. The temperature of these off-gases is about 1400 to 1600° F. and the pressure in this zone is 5 to 15 p.s.i.g. more than in the preceding zone, i.e., a pressure of about 20 p.s.i.g. The conditions in bed 8 are critical in that the gases introduced into bed 8 must have little or no $CO_2$ or $H_2O$ in them or else the Fe and FeO in this zone will be back-oxidized thus raising the percent of oxygen in the product collected in product collection container 49. However, sufficient heat must be added as the sensible heat of the reducing gas fed to bed 8 to carry out the endothermic reductions in bed 8 and to assist in carrying out the endothermic reductions in bed 9.

The entrained fines drawn into cyclone separator 17 are returned to the ferrous reducing zone C via dipleg 19.

In accordance with a preferred embodiment of the invention, a fluid bed of coke into which is introduced a liquid naphtha and air is used as a gasification for producing gases for this process, though the invention is not to be limited to this means of producing the reducing gas. Liquid naphtha is fed through line 1 into bed 3 of zone D containing a fluidized bed of coke at a temperature of 1800 to 2200° F. and a pressure of 5 to 15 p.s.i.g. higher than the preceding zone, i.e., a pressure of about 30 p.s.i.g. The naphtha is preheated to about the temperature just below that at which cracking would begin, and air which is preheated to about 1000° F. is introduced through line 2. Insufficient air is added to completely oxidize the carbon in the naphtha to $CO_2$. In the gasification zone the naphtha is reformed to CO and $H_2$ and the conditions are maintained so that little or no $CO_2$ or $H_2O$ are formed. In the event that small amounts of $H_2O$ or $CO_2$ are formed, they will to a large extent react with the coke in the fluidized coke bed converting $CO_2$ to CO and $H_2O$ back to hydrogen. At high temperature the reducing gases containing substantially only CO, $H_2$, and nitrogen are produced and are withdrawn through chamber 11 and line 4 and used as the fluidizing and reducing gas to carry out the reduction reaction. By having substantially no $CO_2$ or $H_2O$ in this gas it is not necessary to cool and condense the gas to remove water and treat to remove $CO_2$ prior to introducing this gas into the ferrous reducing zone and the sensible heat of this gas as withdrawn from the gasification zone D can be used in the ferrous reducing zone C to provide the heat for the endothermic reductions carried out in that zone. The gas withdrawn from chamber 11 and fed into line 4 can contain a small amount of fluidized coke particles which are separated by cyclone separator 5 and returned by dipleg 6 to bed 3 in zone D. The reducing gas, substantially free of solid particles, is withdrawn from cyclone 5 and fed into line 7 and introduced into bed 8 of zone C.

Under normal conditions for operating the fluidized coke bed, the ratio of CO to $H_2$ in the effluent gas from zone D will be about 0.5 to 1.0.

By varying the amount of naphtha introduced into bed 3 and the amount of air introduced into bed 3, the temperature in bed 3 can be very closely controlled, and the concentration of $CO_2$ and $H_2O$ in the effluent gases can be kept at a minimum. This is an ideal situation for providing the necessary heat for rapidly heating the recycle gases from line 47.

Referring again to quench zone 33, the cold gases are withdrawn from quench zone 33 by line 36. In the quench zone, the withdrawn effluent gases can be cooled to a temperature below its dew point and the condensed water removed through line 35. The primary purpose of this zone, however, is to rapidly cool the hot off-gases to a temperature below about 900° F., e.g., the gases are cooled from a temperature of about 1400 to 1600° F. in less than about 0.5 to 5 seconds, preferably less than one second. The gas is then scrubbed with ethanol amine to remove carbon dioxide in zone 37. The gases thus treated are withdrawn through line 38 and are introduced into zone 40 and contacted either directly or indirectly with cold water which is introduced into zone 40 through line 42 whereby the gas is further cooled and any moisture remaining in the gases is condensed and removed through line 43. The off-gases from zone B, now free of $CO_2$ and $H_2O$, are withdrawn through line 41 for recycle to the process. The particular method or means for effecting the removal of carbon dioxide is not a part of the present invention and therefore needs no detailed description.

Prior to heating and introduction of the thus treated recycle reducing gases to the gasification zone, it is necessary to increase the pressure of these gases in order that they may be introduced into the gasification zone. This is because there is a considerable difference in pressure between the pressure in zone D and the pressure in line 41 due to passage of the gas through the various fluidized beds and the various pieces of equipment. This recycle gas is increased in pressure by compressor 44 while still at ambient temperatures to a pressure of about 5 to 20 p.s.i.g. higher than the pressure in the gasification zone, i.e., to about 30 p.s.i.g. The thus pressurized gas is fed to a suitable furnace 46 wherein the gas is gradually heated by indirect means to a temperature just below the temperature at which carbon deposition and catastrophic carbonization occur. This temperature will be between 800 and 900° F. The thus preheated recycle gas, substantially free of $CO_2$ and $H_2O$ and containing some nitrogen, is withdrawn from heater 46 through line 47 and is introduced into gasification zone D. In zone D, the temperature of the recycle gas is rapidly increased from about 800 to 900° F. to about 1600 to 2200° F. Because of the heat transfer characteristics of the fluidized bed and because of the large amount of sensible heat of the fluidized solid particles in bed 3, this temperature increase is substantially instantaneous, for example, a time of only about 0.5 to 3 seconds, preferably about less than one second. Due to the rapid increase in temperature of the recycle gas, little or no opportunity is given for catastrophic carbonization or carbon deposition to occur.

By a slight modification to the process, the preheated gases in line 47 can be blended with the hot gases in line 7 and rapidly increased in temperature just prior to being introduced into the ferrous reducing zone C, bed 8. However, in order to rapidly increase the temperature of the recycle gases from line 47 it is necessary to operate zone D at temperature such that the off-gases from bed 3 are sufficiently high so that when blended they would provide the necessary heat needed in bed 8 and there would be a sufficient difference in temperature so that this rise in temperature of the gases in line 47 would be sufficiently rapid to prevent catastrophic carbonization and carbon deposition.

From the preceding description it will be apparent that the regeneration and recycle of mixtures of reducing gases, consisting principally of carbon monoxide and carbon dioxide, hydrogen and water in such a manner that prevents deposition of carbon and catastrophic carbonization of metal equipment, greatly benefits the reduction reaction and results in a more efficient and economical use of reducing gases. The reduced iron product is suitably used to replace scrap iron or steel and, if desired, to produce powdered iron therefrom. It will be undertsood that the proportions of carbon monoxide and hydrogen may be varied and that the gases can be obtained from any suitable source. Therefore, the embodiment of the invention described herein should be considered as illustrative and not as limiting the scope of the invention.

The critical features of the present invention are providing a practical means whereby the effluent off-gases from a reducing zone are rapidly cooled from a temperature above about 1200° F. to a temperature below about 900° F. whereby catastrophic carbonization and carbon deposition does not occur. The thus cooled gases are treated to remove $H_2O$ and $CO_2$. The $H_2O$ and $CO_2$ free gases are increased in pressure to the pressure required to introduce them into either a gasification zone or a reducing zone. After compressing the gases but prior to introducing them to the gasification zone or reactor, they are gradually heated to a temperature of about 800 to 900° F. and then are rapidly heated to a temperature above about 1200° F. thereby preventing the deposition of carbon and catastrophic carbonization which normally occurs when gases containing CO are at temperatures between 900 and 1200° F. in accordance with the reaction $2CO \rightarrow CO_2 + C$.

The present invention is illustrated by the following examples:

*Example 1*

Iron ore, containing $Fe_2O_3$, is ground to a suitable size for fluidization and is introduced into a ferric reduction zone wherein it passes from the ferric reduction zone countercurrently to reducing gas into a ferrous reduction zone thereby being reduced in stages from $Fe_2O_3$ to Fe to about 85 to 95% metallization. The Fe containing product is withdrawn and suitably treated to prevent pyrophorosity and stored for later use. The iron is reduced by contacting it countercurrently with a reducing gas consisting essentially of carbon monoxide and hydrogen. The reducing gas is produced by injecting 300 lbs. of naphtha per ton of reduced iron into a fluidized bed of coke to which is added 54 mols of air/ton of reduced iron. The naphtha is reformed in the fluid bed of coke producing a gas consisting essentially of CO and $H_2$. This gas is countercurrently contacted with the iron ore and reduces the iron ore to substantially metallic iron. The off-gas from one of the reducing zones is withdrawn and separated into two portions. One-third of the off-gas is used to reduce the ferric iron to a lower oxide state, essentially to $Fe_3O_4$, and at the same time to provide preheat to the ferric iron. About two-thirds of the hot effluent gases from the ferrous zone are recycled. In order to efficiently recycle these gases, they are rapidly cooled by direct contact with cold water wherein the temperature of the effluent gases is reduced from about 1600° F. to about 200° F. Substantially all of the water present in the effluent gases as an oxidation product of the reduction reaction condenses and separates from the effluent gas and is removed with the quench water. The remaining effluent gas is further cooled to about 78° F. and contacted with ethanol amine which absorbs the $CO_2$. Any moisture remaining in the gases is removed. The gases are now at about 78° F. and are substantially free of $H_2O$ and $CO_2$. This gas contains about 20% $H_2$, 16.5% CO, 1.5% $CO_2$, 2% $H_2O$, and 60% $N_2$. The gas is at a pressure of about 15 p.s.i.g. and is fed to a compressor whereby the pressure is increased to about 200 p.s.i.g. The compressed gas is introduced to a gas furnace where it is gradually raised in temperature from about 78° F. to about 875° F. The preheated gas is then fed directly to a fluidized bed of coke, which is used as a gasification zone, and rapidly increased in temperature from about 875° F. to about 1725° F. The temperature increase is almost instantaneous. The composition of the effluent gases from the gasification zone are about 22.5% $H_2$, 20% CO, 1.0% $CO_2$ 1.5% $H_2O$, and 55% $N_2$. To show the efficiency of this reaction and the complete utilization of the reducing gas produced, the gas vented from the ferric reducing zone after providing preheat in that zone is analyzed and found to contain about 5% $H_2$, 3% CO, 10% $CO_2$, 12% $H_2O$, and 70% $N_2$. Using a part of the effluent gases from the ferrous reducing zone as preheat for the ferric zone provides a suitable purge of nitrogen from the system and prevents excessive buildup of nitrogen in the system.

*Example 2*

Finely divided iron ore containing $Fe_2O_3$ is reduced in three stages to 85% metallic iron. The first stage of reduction is also a preheat stage. The ore is reduced by countercurrently contacting it with a reducing gas consisting essentially of CO and $H_2$. The reducing gas in this embodiment is produced by gasifying a naphtha fuel with air in a non-catalytic gas generator at 2500° F. and at slightly elevated pressure. The carbon-to-hydrogen ratio of the fuel is about $C_1H_{2.3}$. The ratio of air to fuel is about 2.6 to 1. These conditions produce a high quality reducing gas containing very little $CO_2$ and $H_2O$. The reducing gas is fed to a 500 metric ton per day of 85% iron direct reduction reactor. About 40–45% of the effluent gases from the second stage of reduction wherein $Fe_3O_4$ is reduced to FeO is fed to the $Fe_2O_3$ reducing-preheat zone to partially reduce the ore used wherein it is partially oxidized with air to preheat the incoming ore. The remainder of the gas at a temperature of about 1400° F. is rapidly cooled by direct contact with cooling water and then treated to remove $H_2O$ and $CO_2$. The gas is then recompressed to a pressure sufficient to introduce it into the line coming from the gas generator. After compression, the gas is heated by indirect contact in a gas furnace to about 800° F. and then blended with hot effluent gas from the gas generator which is at a temperature of about 2500° F. and the blended gases at a temperature of about 1600° F. are fed to the FeO reducing zone to maintain a temperature in that zone of about 1400° F. Blending the recycle gas at about 800° F. with the effluent gases from the gas generator at 2500° F. rapidly increases the temperature of the recycle gas to about 1600° F. in about less than one second, thereby preventing carbon deposition and catastrophic carbonization while the recycle gas transits the temperature range of 900 to 1200° F.

Obviously, many modifications and variations of the invention as hereinbefore set forth may be made without departing from the spirit and the scope thereof. The recycle gas may be rapidly increased in temperature by introduction directly in a reducing zone provided sufficient heat is available in the particular zone to rapidly increase the temperature of the reducing gas without reducing the temperature in the zone below that at which the iron oxides are reduced. Also, the gases may be rapidly heated from ambient temperatures to a temperature above 1200° F. in a single step, though for purposes of efficiency the described two-step process is preferred.

In a process wherein the gasification reaction is carried out in a fluidized bed of partially reduced iron ore by feeding a hydrocarbonaceous fuel and an oxygen-containing gas to such a zone, the recycle gas can be fed directly to this zone and sufficient air and fuel added to maintain the proper reducing temperature and equilibrium conditions in the zone.

The invention is intended to include any means by which the hot recycle gases are rapidly cooled, and the cooled, regenerated recycle gases are rapidly heated in such a manner that neither carbon deposition or catastrophic carbonization occurs. Therefore, only such limitations should be imposed as are indicated in the appended claims.

What is claimed is:

1. In a process wherein metallic oxide is reduced to a lower state of oxidation in a reduction zone at temperatures ranging from about 1200° F. to about 1800° F. by contact of said oxide with a carbon monoxide-containing gas to partially oxidize said carbon monoxide gas to produce an effluent gas containing unreacted carbon monoxide and carbon dioxide, the steps comprising withdrawing the effluent gas from the said reduction zone and treating said effluent gas while the gas is in contact with metal, by cooling the temperature thereof below about 900° F. and through the 900° F. to 1200° F. temperature range within an interval of time ranging from about 0.5 to 5 seconds and regenerating the gas by increasing the carbon monoxide concentration relative to the carbon dioxide concentration in the gas by removal of carbon dioxide, then compressing said cooled regenerated effluent gas and rapidly reheating said regenerated effluent gas through the 900° F. to 1200° F. temperature range within an interval of time ranging from 0.5 to 5 seconds, and recycling same back to said reduction zone.

2. The process of claim 1 wherein the temperature of the compressed, cooled, regenerated effluent gas is heated and the temperature thereof is raised to from about 1200° F. to about 1800° F. and then recycled to the reduction zone.

3. The process of claim 1 wherein the metallic oxide is reduced by contact with a gaseous mixture of carbon monoxide and hydrogen to produce an effluent gas containing unreacted carbon monoxide and hydrogen, carbon dioxide and water, and the last-mentioned effluent gas is treated outside the reduction zone to regenerate the gas by removing both carbon dioxide and water therefrom.

4. The process of claim wherein the metallic oxide is iron oxide.

5. In a process wherein iron oxides are reduced to metallic iron in a series of staged, fluidized iron oxides reduction zones, including a zone wherein iron oxides are reduced to a lower state of oxidation at temperatures ranging from 1400 to about 1800° F., a zone wherein the lower oxides of iron are reduced to ferrous oxides at temperatures ranging from about 1200 to about 1800° F. and a ferrous reduction zone wherein ferrous oxide is reduced to metallic iron at temperatures ranging from about 1400° F. to about 1600° F., the steps comprising generating a reducing gas in a generating zone wherein hydrocarbon fuel and oxygen-containing gas are contacted, at a temperature ranging from about 1800° F. to about 2200° F., with coke solids particles, said reducing gas consisting essentially of carbon monoxide and hydrogen, contacting the iron oxides of the reduction zones with said reducing gas, withdrawing an effluent gas from the zone wherein the lower oxides are reduced to ferrous oxide while said effluent gas is at a temperature of said zone, and treating while the gas is in contact with metal, by quenching said effluent gas with water to reduce the temperature below about 900° F. and through the 900° F. to 1200° F. temperature range within an interval of time ranging from about 0.5 to 5 seconds to remove water from the effluent gas, further cooling said effluent gas and scrubbing out carbon dioxide, compressing said cooled and scrubbed effluent gas and rapidly reheating said last mentioned effluent gas through the 900° F. to 1200° F. temperature range within an interval of time ranging from 0.5 to 5 seconds, and recycling same back to said ferrous reduction zone.

6. The process of claim 5 wherein the cooled and scrubbed gas is recycled to the reduction gas generating zone and thence to the ferrous oxide reduction zone.

References Cited by the Examiner

UNITED STATES PATENTS

| | | | |
|---|---|---|---|
| 2,547,685 | 4/1951 | Brassert et al. | 75—35 |
| 2,577,730 | 12/1951 | Benedict et al. | 75—35 |
| 2,742,353 | 4/1956 | Ogorzaly | 75—26 |
| 2,821,471 | 1/1958 | Sellers | 75—26 |
| 2,921,848 | 1/1960 | Agarwal | 75—26 |
| 2,977,2116 | 3/1961 | Whaley | 75—26 |
| 3,126,276 | 3/1964 | Marshall et al. | 75—35 |

BENJAMIN HENKIN, Primary Examiner.